(12) United States Patent
Heider et al.

(10) Patent No.: US 8,032,560 B2
(45) Date of Patent: *Oct. 4, 2011

(54) PROVISION OF PERSISTENCE CONTEXT TO PROGRAM COMPONENTS

(75) Inventors: Sabine Heider, Neckargemuend (DE); Markus J. Kuefer, Heidelberg (DE); Nikolai D. Tankov, Sofia (BG)

(73) Assignee: SAP AG, Walldorf (DE)

( * ) Notice: Subject to any disclaimer, the term of this patent is extended or adjusted under 35 U.S.C. 154(b) by 319 days.

This patent is subject to a terminal disclaimer.

(21) Appl. No.: 11/437,510

(22) Filed: May 18, 2006

(65) Prior Publication Data

US 2007/0271210 A1    Nov. 22, 2007

(51) Int. Cl.
G06F 17/30 (2006.01)
G06F 15/16 (2006.01)

(52) U.S. Cl. .......................... 707/796; 709/217

(58) Field of Classification Search .............. 707/1, 809, 707/796; 709/315, 217

See application file for complete search history.

(56) References Cited

U.S. PATENT DOCUMENTS

| | | | |
|---|---|---|---|
| 2002/0032775 A1* | 3/2002 | Venkataramaiah et al. | 709/225 |
| 2003/0028682 A1* | 2/2003 | Sutherland | 709/315 |
| 2006/0031388 A1 | 2/2006 | Tankov et al. | |
| 2007/0271351 A1 | 11/2007 | Heider | |

OTHER PUBLICATIONS

Bsampieri, Case11_437510_J2SE_VS_J2EE.pdf, Nov. 4, 2003,Sun Microsystems forum.*

Heider et al—US Patent Application Filed May 18, 2006—Provision of Connections for Program Components.
Bea Thinkliquid—Kodo—Introduction to the EJB 3 Java Persistence API.
DeMichiel—JavaOne—Enterprise JavaBeans (EJB) 3.0 Architecture Simplified Persistence—2004.
DeMichiel et al—Sun Microsystems—JSR 220: Enterprise JavaBeans, Version 3.0 Java Persistence API—Dec. 19, 2005.
DeMichiel et al—Dec. 18, 2005—JSR 220: Enterprise JavaBeans, Version 3.0—EJB 3.0 Simplified API.
Anderson—Jul. 18, 2006—JDBC 4.0 Specification—JSR 221.
USPTO, "OA Mailed Jun. 26, 2008 for U.S. Appl. No. 11/437,532", (Jun. 26, 2008), Whole Document.
"U.S. Appl. No. 11/437,532, Advisory Action mailed Apr. 7, 2009", 3 pgs.
"U.S. Appl. No. 11/437,532, Final Office Action mailed Jan. 8, 2010", 14 pgs.
"U.S. Appl. No. 11/437,532, Final Office Action mailed Jan. 16, 2009", 17 pgs.
"U.S. Appl. No. 11/437,532, Non Final Office Action mailed Jun. 26, 2008", 18 pgs.
"U.S. Appl. No. 11/437,532, Non-Final Office Action mailed Jun. 26, 2009", 11 pgs.
"U.S. Appl. No. 11/437,532, Response filed Mar. 16, 2009 to Final Office Action mailed Jan. 16, 2009", 9 pgs.

(Continued)

*Primary Examiner* — James Trujillo
*Assistant Examiner* — Amresh Singh
(74) *Attorney, Agent, or Firm* — Schwegman, Lundberg & Woessner, P.A.

(57) ABSTRACT

A method and apparatus for provision of persistence context to program components. An embodiment of a method includes receiving a call from a persistence engine, the call requesting a persistence context for a program component of a computer application. There is a method call to obtain the persistence context; and the persistence context is provided to the persistence engine. Other embodiments are also disclosed and claimed.

24 Claims, 8 Drawing Sheets

OTHER PUBLICATIONS

"U.S. Appl. No. 11/437,532, Response filed Sep. 9, 2009 to Non Final Office Action mailed Jun. 26, 2009", 12 pgs.

"U.S. Appl. No. 11/437,532, Response filed Sep. 22, 2008 to Non Final Office Action mailed Jun. 26, 2008", 17 pgs.

"U.S. Appl. No. 11/437,532, Response filed Mar. 10, 2010 to Final Office Action mailed Jan. 8, 2010", 10 pgs.

"Java Database Connectivity", *Wikipedia*, [Online]. Retrieved from the Internet: <URL: http://en.wikipedia.org/w/index.php?title=Java_Database_Connectivity&oldid=22806>, (Mar. 2002), 1 pg.

"Java Platform, Enterprise Edition", *Wikipedia*, [Online]. Retrieved from the Internet: <URL: http://en.wikipedia.org/w/index.php?title=Java_Platform,_Enterprise_Edition&oldid=34903299>, (Jan. 2006), 5 pgs.

"Java Platform, Standard Edition", *Wikipedia*, [Online]. Retrieved from the Internet: <URL: http://en.wikipedia.org/w/index.php?title=Java_Platform_Standard_Edition&oldid=23532>, (Mar. 2002), 1 pg.

"U.S. Appl. No. 11/437,532, Non-Final Office Action mailed Mar. 26, 2010", 11 pgs.

Johnson, Rod, "",*Spring Java/J2EE Application Framework Reference*, Documentation Version 1.1.5, (2004), 223 pgs.

"U.S. Appl. No. 11/437,532 Final Office Action mailed Jul. 28, 2010", 13 Pgs.

"U.S. Appl. No. 11/437,532, Response filed Jun. 22, 2010 to Non Final Office Action maield Mar. 26, 2010", 8 pgs.

"U.S. Appl. No. 11/437,532, Response filed Dec. 28, 2010 to Final Office Action mailed Jul. 28, 2010", 8 pgs.

\* cited by examiner

PROVISION OF PERSISTENCE CONTEXT TO PROGRAM COMPONENTS

TECHNICAL FIELD

Embodiments of the invention generally relate to the field of computer systems and, more particularly, to a method and apparatus for provision of persistence context to program components.

BACKGROUND

In computer applications in which program components or objects are utilized, the persistence of the program components is a factor to be addressed by a developer. The persistence of the program objects may vary according to the needs of a system and the type of program components that are utilized.

For example, program components may include enterprise JavaBeans (EJBs) that exist in a Java 2 Platform, Enterprise Edition (J2EE) environment or in a standalone operation in the Java 2 Platform, Standard Edition (J2SE). The persistence of such components is governed by the standards for an EJB, including the Enterprise JavaBean Specification 3.0 (referred to herein as the EJB 3.0 Specification).

Program components may exist in various different environments, depending on the type of operation. In a conventional process, it may be necessary to handle persistence in differing manners depending on the operation.

In the particular example of EJB persistence, an EJB persistence provider can be used both in enterprise and standalone situations, in J2EE and J2SE environments respectively. In conventional operations, the environments are generally treated differently for persistence. For this reason an application developer is generally required to separately address the different operations in each such environment, thereby complicating the application development process.

SUMMARY OF THE INVENTION

A method and apparatus for provision of persistence context to program components.

In a first aspect of the invention, an embodiment of a method includes receiving a call from a persistence engine, the call requesting a persistence context for a program component of a computer application. There is a method call to obtain the persistence context; and the persistence context is provided to the persistence engine. Other embodiments are also disclosed and claimed.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a method and apparatus for provision of persistence context to program components.

As used herein, a "software component" or "component" is a reusable set of code or program block that can be combined with other components to form an application. In an example, a component may represent a software bundle of variables and related methods that is utilized in object-oriented programming. "Component" includes a JavaBean in Java application development.

As used herein, an "enterprise JavaBean" or "EJB" is a JavaBean component provided for the Java 2 Platform, Enterprise Edition (J2EE) environment. EJBs include "session beans", which are not persistent, and "entity beans", which represent business objects in a persistent storage mechanism. Session beans may be "stateful" or "stateless". A stateful session bean is an EJB that acts as a server-side extension of the client that uses it. The stateful session bean is created by a client and will work for only that client until the client connection is dropped or the bean is explicitly removed, with the state being retained for the duration of the client-bean session. If the client removes the bean or terminates, the session ends and the state disappears. A stateless session bean does not maintain a conversational state for a particular client. When a client invokes the method of a stateless bean, the bean's instance variables may contain a state, but only for the duration of the invocation. When the method is finished, the state is no longer retained.

As used herein, "persistence" is the quality of a program component to exist beyond an application or process. For example, an entity bean may be referred to as persistent because the state of the entity bean may exist beyond the lifetime of an application or a J2EE server process. For an EJB, persistence may include container-managed persistence, where an EJB container handles all database access required by the entity bean and is responsible for saving the state of the bean, and bean-managed persistence, where the entity bean handles database access is directly responsible for saving its own state.

As used herein, a "container" is an application program or subsystem in which a component is run. A container represents an interface between a component, such as a JavaBean, and the low-level platform-specific functionality that supports the component. Containers include EJB containers, which manages the execution of EJBs for J2EE applications. Enterprise JavaBeans and their container run on a J2EE server.

As used herein, a "connection" is a link between a program object and a database. A connection object represents a connection with a database. A single application may have one or more connections with a single database, or it may have connections with multiple different databases.

In an embodiment of the invention, a component or agent, referred to herein as an environment manager, provides persistence context to program components in an enterprise environment. In an embodiment of the invention, an environment manager provides a common interface to a core persistence engine for the purpose of providing persistence contexts. In an embodiment of the invention, the environment manager collaborates with the resource management system of the core persistence engine to provide program component persistence.

In an embodiment of the invention, the operation of an environment manager may be used to simplify the process of product development. For example, the question of whether the connection participates in a distributed transaction or not varies in different circumstances. In an embodiment of the invention, a developer does not need to be concerned with whether the connection participates in a distributed transaction when getting a connection from the environment manager. In an embodiment of the invention, the environment manager provides the same interface in both cases.

In computer programming, applications often include components. Components may include, but are not limited to, JavaBeans such as enterprise JavaBeans (EJBs). In an example, applications in and enterprise environment such as J2EE or a standalone environment such as J2SE.

While operations may vary in different embodiments, in an embodiment of the invention the persistence of EJB components may be governed by the EJB 3.0 specification. The EJB 3.0 specification provides a persistence API (application program interface) that is supported in the enterprise environment and may also be supported in a standalone environment.

An entity manager is associated with a persistence context. A persistence context is a set of entity instances in which, for any persistent entity identity, there is a unique entity instance. The entity instances and the lifecycle of such instances are managed within a persistence context. In this environment, an entity manager API defines the methods that are used to interact with the persistence context. The entity manager API is used to create and remove persistent entity instances, to find such, and to make queries regarding such entities.

The set of entities that are managed by an entity manger instance are defined by a persistence unit. The persistence unit defines the set of all classes that are related or grouped by an application. Persistence is then handled by the core persistence engine. As used herein, the core persistence engine may include the entity manager factory, the entity manager, and the persistence context. The core persistence engine is coupled with the persistence unit. In an embodiment of the invention, an environment manager supports the operation of the core persistence engine.

Under the EJB specification, the new entity beans may be viewed as being essentially POJOs (plain old Java objects) with added annotations, and as such are not inherently persistent entities. An entity instance becomes persistent once it is associated with an entity manager and becomes part of a persistence context. The persistence context implicitly coexists with a transaction's scope. Entity relationships are also defined through annotations. According to the EJB 3.0 specification, the EJB persistence provider can be used in both J2EE (enterprise) and J2SE (standalone) environments. Both cases differ fundamentally in the management of resources like transactions and database connections. In an embodiment of the invention, a separate component called an environment manager hides these differences and provides a common interface to the core persistence engine. The environment manager collaborates with the resource management system of the persistence engine to accomplish this.

The relationship between an entity manager and the persistence context is not static, but instead depends on the configuration of the involved objects and the current transaction state. For example, the configuration may include whether the entity manager is container-managed or application-managed, whether JTA (Java transaction API) transactions or resource-local transactions are used, and whether the persistence contexts are transaction-scoped or extended. In an embodiment of the invention, the environment manager decouples the core persistence implementation from these dependencies by encapsulating the logic for the dynamic association between the entity manager and the persistence context. In an embodiment, instead of keeping a reference to the persistence context, the entity manager requests a persistence context object from the environment manager at the beginning of each method. The entity manager operates on this persistence context, and then returns the persistence context after usage of the persistence context.

In applications, transactions may be managed and controlled in various ways, which affects operations such as persistence. For example, a transaction may be controlled by a transactions manager or similar entity and managed by a container. In another example, a transaction may be managed by the application itself. In Java applications, JTA transactions are managed by a transaction manager. These may be contrasted with resource-local transactions, which are managed by the application. The JTA specifies standard Java interfaces between a transaction manager and the parties involved in a distributed transaction system, such parties being the resource manager, the application server, and the transactional applications. The JTA API specifically allows a developer to demarcate transactions in a manner that is independent of the transaction manager implementation. The J2EE SDK (software developer's kit) implements the transaction manager with the Java transaction service (JTS). A JTA transaction is specifically controlled by the J2EE transaction manager. The jta-data-source element indicates that the transactions in which the entity manager takes part are JTA transactions, meaning that transactions are managed by the container. Alternatively, a developer may use resource-local transactions, which are transactions controlled by the application itself. The choices between such transactions are based on the particular application being developed. For example, web application developers commonly use JTA transactions to avoid the need to manually manage the life cycle of the entity manager instance.

In an embodiment of the invention, the environment manager provides the core persistence engine with persistence contexts and JDBC (Java database connectivity) connections, with both tasks requiring knowledge about the current transactional state. In an embodiment, the environment manager must interoperate with the underlying transactions. For example, the EJB 3.0 specification provides that persistence supports both JTA transactions and resource-local transactions, but the mechanism to integrate with transactions is different for these transactions. The EJB 3.0 specification separates these transaction types. In general, an entity manager factory (and thus all dependent objects, such as an entity manager) is either configured to work with JTA transactions or with resource-local transactions, and not with both types. In an embodiment of the invention, different implementations of the environment manager interface may be provided for JTA transactions and resource-local transactions.

As used here in relation to an embodiment of the invention:

Entity manager factory—The entity manager factory is the element used to generate entity manager instances. The entity manager factory is configured to work with exactly one persistence unit and transaction type (JTA or resource-local).

Entity manager—The entity manager is the central interface to the client, and is used to manipulate persistent entities.

The entity manager does not hold any data itself, but instead works on the objects managed in the persistence context. In an embodiment of the invention, the entity manager does not store the reference to the persistence context, but retrieves the persistence context from the environment manager at the beginning of each method call.

Persistence context—The persistence context holds the managed entity bean instances and operates to guarantee their uniqueness within the context. Entities within the persistence context are synchronized to the database. This synchronization requires an active transaction (either JTA or resource-local).

Query—A query is to execute EJB QL (query language) statements. The entities returned by the query are under the control of the persistence core engine, i.e. the entities are contained in the persistence context.

Environment manager—In an embodiment of the invention, the environment manager provides persistence contexts and JDBC connections to the core persistence engine. The environment manager is intended to abstract from the engine's resource management and to encapsulate the dependencies from the current environment. In an embodiment, a JTA-aware implementation of the environment manager may reuse an existing J2EE-engine's proprietary internal contract between the EJB container or the web container, respectively for different operations, and the connector service's resource system that manages all transactional resources, such as JDBC, JMS (Java message service), and JCA (J2EE connector architecture) resources. The containers may be used to control any kind of resources in a uniform way using this contract. An integral part of this contract is the resource context. The resource context is a construct that can hold resources and a transaction object. Each EJB component has its own resource context associated with it. For web components, a different resource context is associated for each request.

Only one resource context is contained in a current thread's ThreadLocal while this thread executes code of a certain component. For EJB components, the EJB container replaces the resource context that is currently associated with the thread by its own resource context, and it puts the original resource context into place once the EJB call stack returns. While a JTA transaction is active, it is associated with the thread's actual resource context.

Persistence contexts are handled as resources like JDBC connections or any other transactional resource. In an embodiment of the invention, as they are a part of a thread's resource context, the environment manager is able to decide whether the method getPersistenceContext should return a new persistence context object or an already existing one, according to the requirements.

In an embodiment of the invention, another responsibility of the environment manager is to guarantee that the persistence context takes part in JTA transactions to have it synchronized with the database at commit time. In an embodiment, this is achieved by registering the persistence context as a listener to the appropriate JTA transaction events. To be able to do so, the persistence context must implement the javax.transaction.Synchronization interface. The event mechanism will then notify a registered persistence context right before and after the transaction ends by calling the persistence context's beforeCompletion and afterCompletion method, respectively. On beforeCompletion, the persistence context flushes its current state to the database, whereas on afterCompletion the persistence context may be closed if appropriate.

The implementation of an environment manager for resource-local transactions may be implemented in a straightforward manner, with a 1:1 relationship between the environment manager, the entity manager, the entity transaction, and the persistence context. The environment manager has access to the corresponding entity transaction object to get information about the transactional state. The environment manager uses this information to return on a getPersistenceContext call either a new or an already existing persistence context object, according to the requirements.

When a component of a core persistence engine needs to access an underlying database, it requires a connection to such database. For example, in J2EE and J2SE environments a JDBC (Java database connectivity) connection is required. However, the manner in which JDBC connections are obtained and managed is different in J2EE and J2SE environments. In an embodiment of the invention, in order to abstract from these dependencies, the environment manager provides a method to obtain a JDBC connection. In this embodiment, within the scope of either a JTA or resource-local transaction, the environment manager will return the same connection in each case. The connection is then closed at the end of the transaction.

Whenever a component of the core persistence engine needs to access the underlying database, it requires a JDBC connection. How JDBC connections are obtained and managed is different in J2EE and J2SE environments. In an embodiment of the invention, the environment manager abstracts from these dependencies, and provides a method to obtain a JDBC connection for both circumstances. Within the scope of a transaction, JTA or resource-local, the environment manager always returns the same connection. The connection is closed at the end of the transaction.

In an embodiment of the invention, the environment manager uses the data source that is configured in the persistence unit to create a JDBC connection when required. Connections created within the scope of an active transaction are closed by the transaction object when the transaction ends. Connections created outside a transaction are related with a persistence context that serves a single entity manager call only and are closed when the corresponding persistence context object is closed.

In an embodiment of the invention, an environment manager API may include the following methods:

getPersistenceContext—Returns the persistence context associated with the current transaction and/or entity manager instance. The persistence context may be either an already existing shared one, or it may be newly created as a shared or unshared one.

closePersistenceContext—Informs the environment manager that the persistence context is no longer needed. Depending on the current situation (e.g. whether the transaction is currently active, whether the persistence context is extended, or other circumstances), the environment manager will decide to physically close the persistence context or to ignore the call. The persistence context should be closed if there is no active transaction and if the persistence context is transaction-scoped. In all other cases, the method should be a no-op (No operation).

getConnection—Returns a JDBC connection, such that:

For persistence context matrix cases (a) and (b) from FIG. 5 below: Within one transaction, always return the same connection.

For persistence context matrix case (c): Return different connections to different EMs/PCs. Within one transaction, always return the same connection to the same EM/PC.

releaseConnection—Hands a connection that is no longer needed back to the environment manager. The environment manager may close the connection if appropriate, as in when an entity is transaction-scoped and is outside the transaction.

isTransactionActive—Returns true if and only if there is a transaction associated that is in an active state.

isTransactionMarkedForRollback—Returns true if and only if there is a transaction associated that is marked for rollback.

markTransactionForRollback—Marks the current transaction so that the only possible outcome of the transaction is for the transaction to be rolled back.

rollback—Triggers a rollback of the current transaction.

joinTransaction—Associates the EntityManager with the current distributed transaction. (For implementation targeted at distributed transactions only)

getEntityManagerFactory—Returns the entity manager factory with which this environment manager is associated.

getTransaction—Returns the resource-local transaction object. (For implementation targeted at resource-local transactions only)

Figure 1:
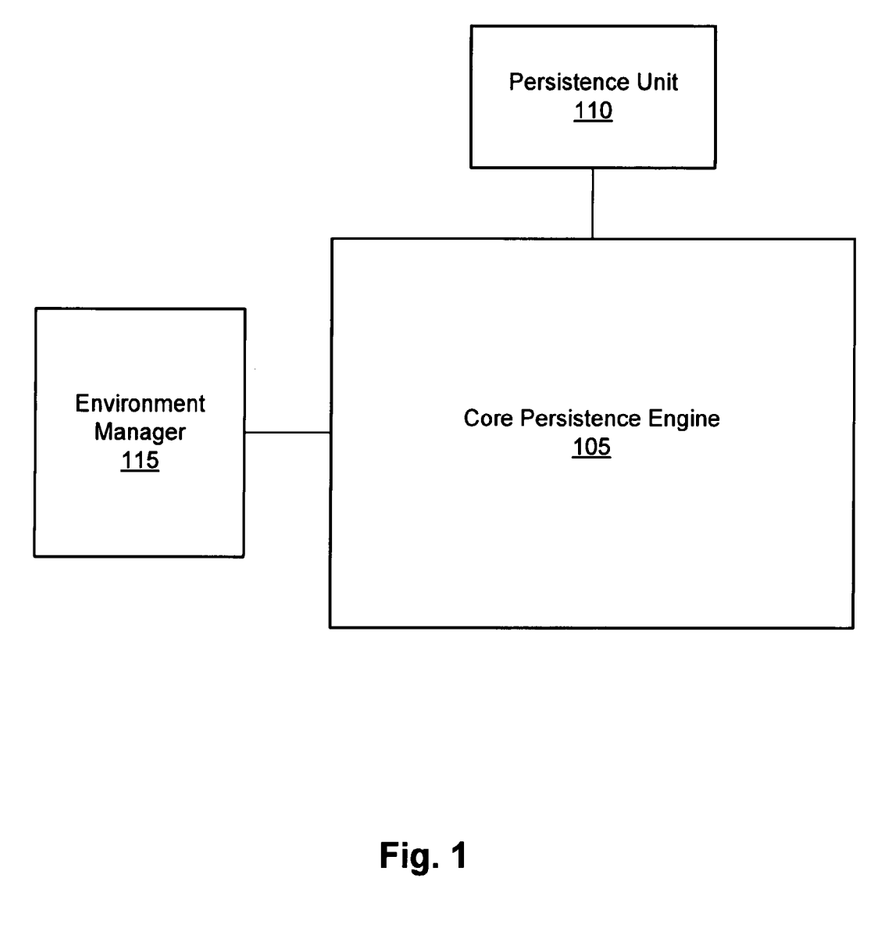
FIG. 1 is an illustration of persistence elements in an embodiment of the invention.

FIG. 1 is an illustration of persistence element in an embodiment of the invention. In this illustration, a persistence unit 110 defines a set of entities that are managed by an entity manger instance. The persistence unit defines the set of all classes that are related or grouped by an application. Persistence is then handled by a core persistence engine 105. The core persistence engine varies with different embodiments, but may include an entity manager factory, an entity manager, and a persistence context. The core persistence engine 105 is coupled with the persistence unit 110.

In an embodiment of the invention, an environment manager 115 supports the operation of the core persistence engine. In an embodiment of the invention, the environment manager abstracts the different environments that may be faced by the core persistence engine 105, thereby providing a consistent process for the operation of persistence contexts for program components.

Figure 2:
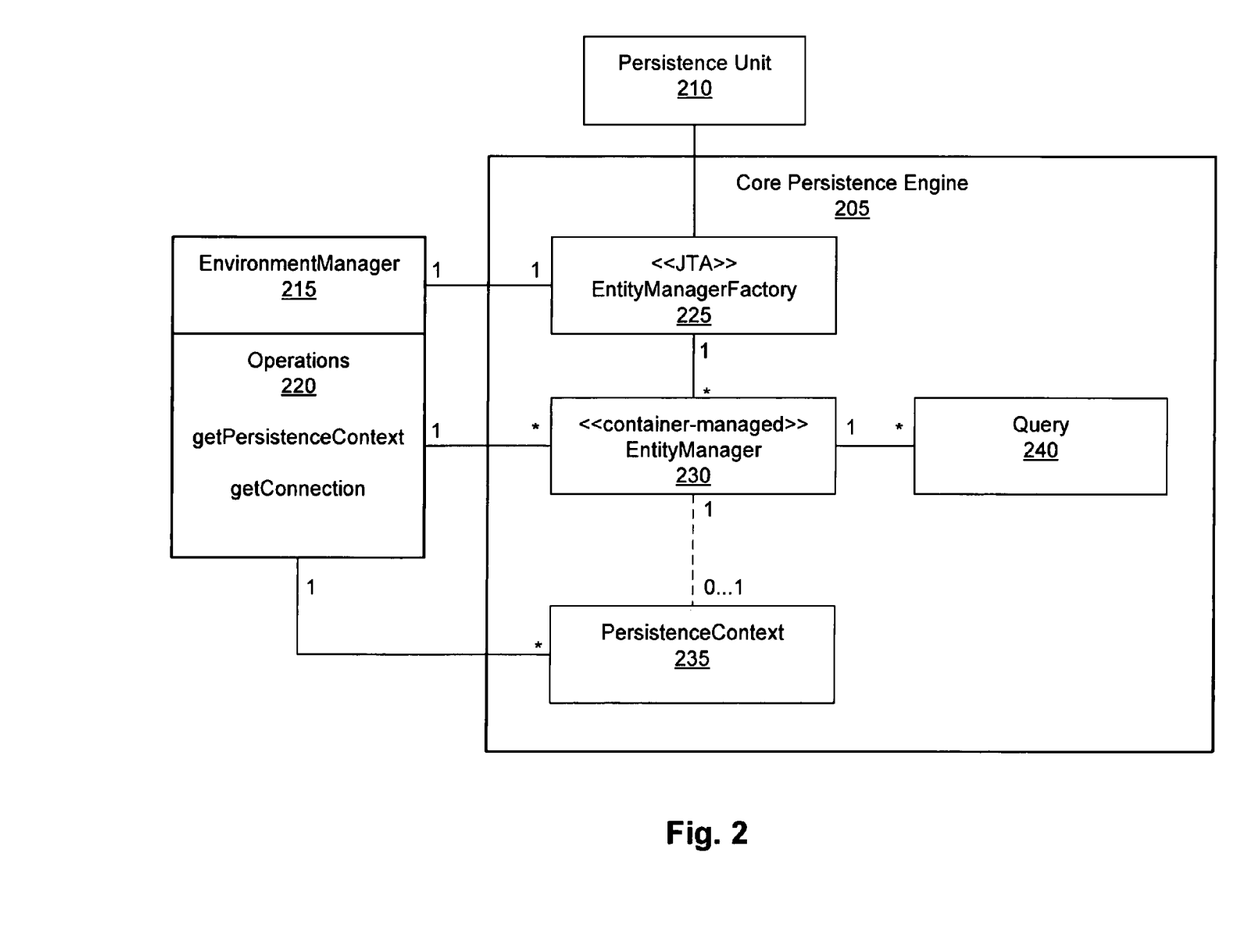
FIG. 2 is an illustration of an embodiment of a persistence engine for distributed transactions and container-managed entity managers.
Figure 3:
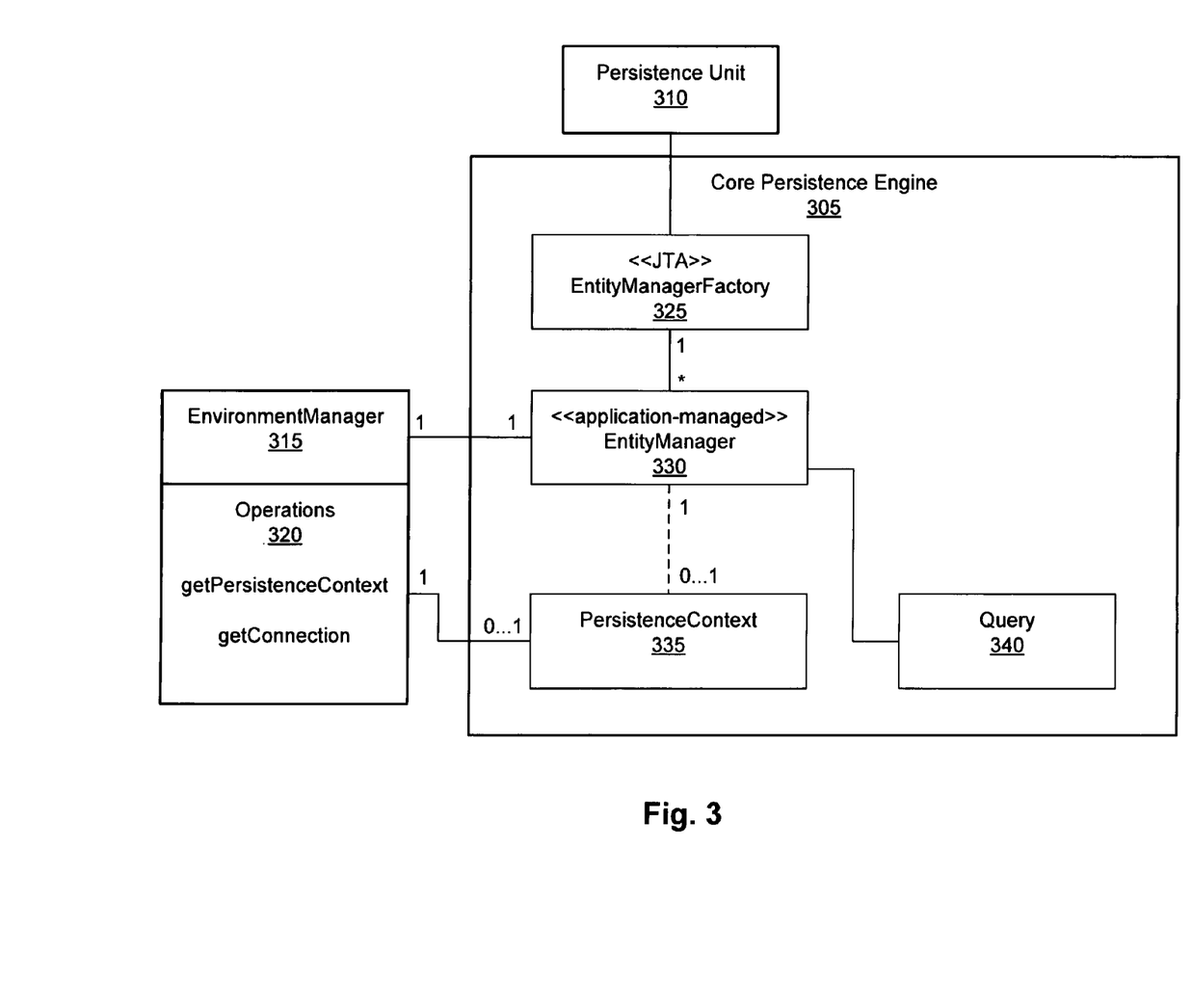
FIG. 3 is an illustration of an embodiment of a persistence engine for distributed transactions and application-managed entity managers.
Figure 4:
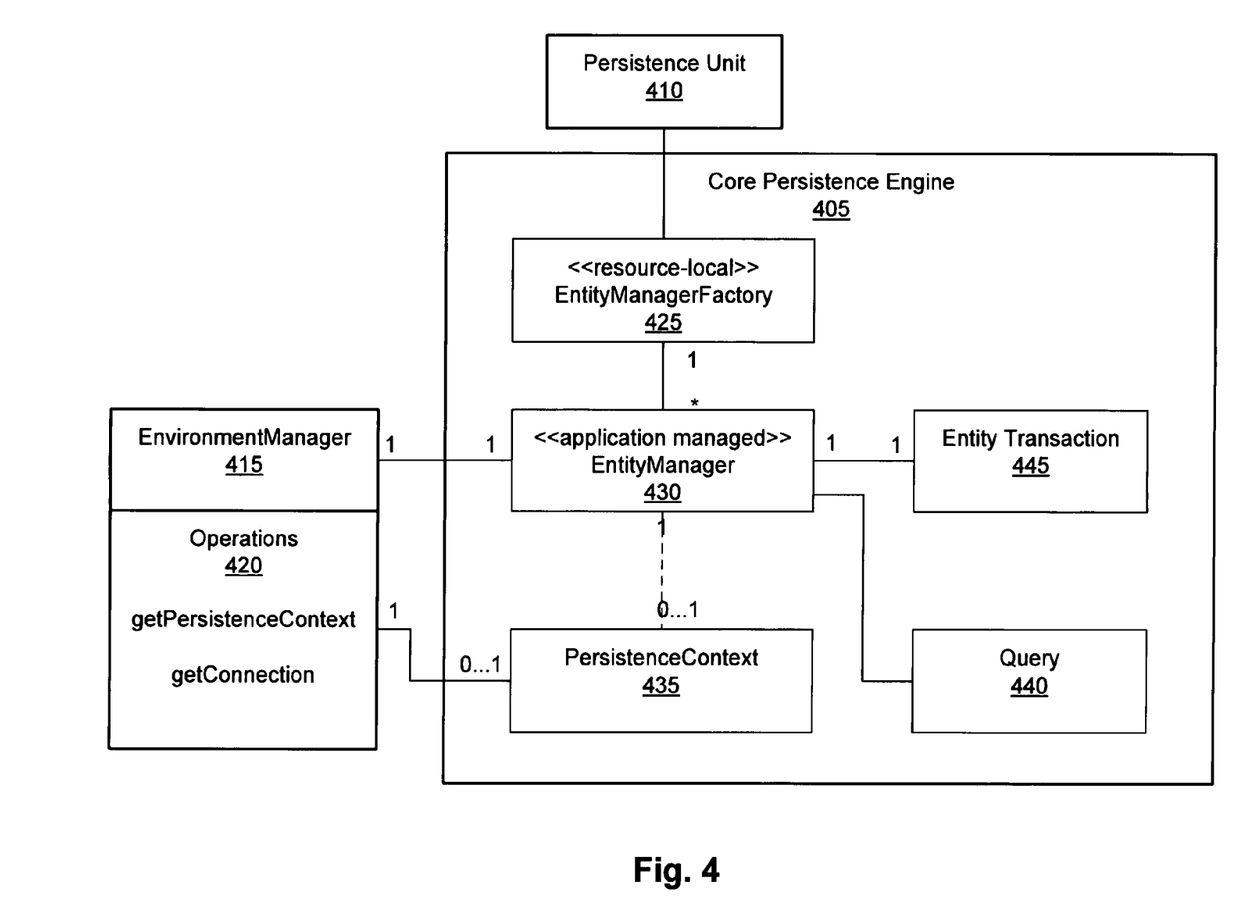
FIG. 4 is an illustration of an embodiment of a persistence engine for resource-local transactions and application-managed entity managers.

FIGS. 2, 3, and 4 illustrate the relationship between the environment manager and the components of the core persistence engine in varying embodiments of the invention.

FIG. 2 is an illustration of an embodiment of a persistence engine for distributed transactions and application-managed entity managers. In one example, the EJB 3.0 specification defines the concept of persistence context propagation within the scope of a JTA transaction. Container-managed entity managers that have been created using the same entity manager factory share the same persistence context object if they are called within the same JTA transaction.

FIG. 2 illustrates a core persistence engine 205 coupled with a persistence unit 210 and an environment manager 215. The environment manager 215 includes certain operations 220, including an operation to get a persistence context and to get a connection. The core persistence engine includes an entity manager factory 225 to generate some number of instances of entity managers 230. Each entity manage may be associated with a persistence context 235. Each entity manager 230 may generate one or more queries 240 regarding persistence.

In an embodiment of the invention, to facilitate persistence context propagation, there is one environment manager instance 215 for each entity manager factory 225. The environment manager can thus manage the persistence contexts and JDBC connections for all entity managers obtained from the particular entity manager factory.

FIG. 3 is an illustration of an embodiment of a persistence engine for distributed transactions and application-managed entity managers. FIG. 3 illustrates a core persistence engine 3 05 coupled with a persistence unit 310 and an environment manager 315. The environment manager 315 again includes certain operations 320, including an operation to get a persistence context and to get a connection. The core persistence engine includes an entity manager factory 325 to generate some number of instances of entity managers 330. Each entity manager may be associated with a persistence context 335. Each entity manager 330 may generate one or more queries 340 regarding persistence. In an embodiment of the invention, there is one environment manager instance 315 for each entity manager instance 330.

FIG. 4 is an illustration of an embodiment of a persistence engine for resource-local transactions and application-managed entity managers. With resource-local transactions, different entity manager instances are completely separated from each other. Each entity manager uses its own entity transaction object. Different entity managers therefore can't run in the same transactional context, and thus never share persistence context objects with each other. Since there is no need to manage persistence contexts and JDBC connections globally on the level of the entity manager factory, as is true with JTA transactions, one environment manager instance may be provided per entity manager instance.

FIG. 4 illustrates a core persistence engine 405 coupled with a persistence unit 410 and an environment manager 415. The environment manager 415 includes certain operations 420, including an operation to get a persistence context and to get a connection. The core persistence engine includes an entity manager factory 425 to generate some number of instances of entity managers 430. Each entity manager may be associated with a persistence context 435. Each entity manager 430 may generate one or more queries 440 regarding persistence, and is associated with a single entity transaction 445. In an embodiment of the invention, there is one environment manager instance 415 for each entity manager instance 430.

Figure 5:
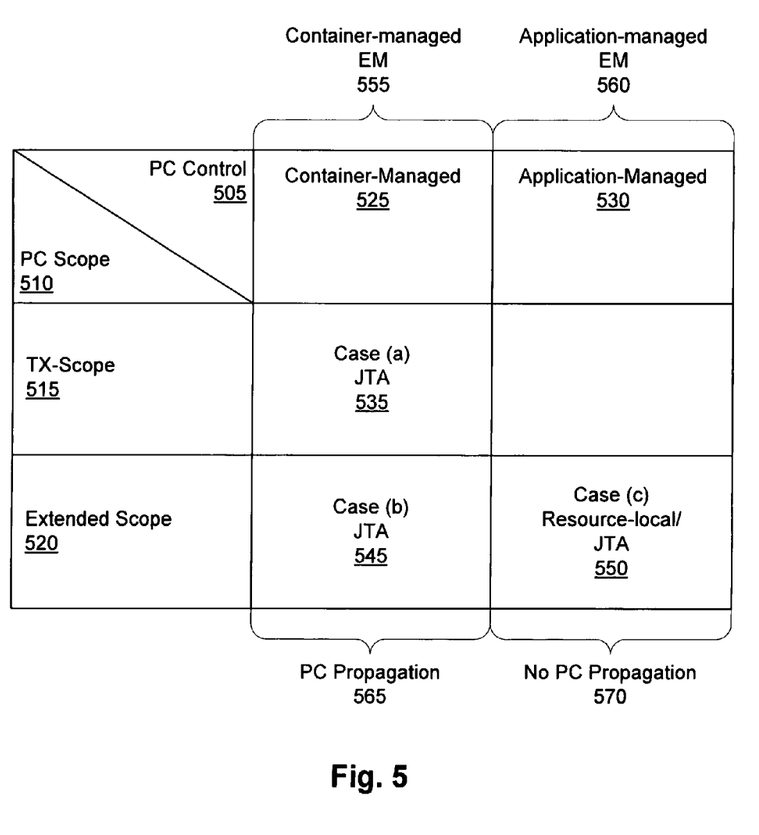
FIG. 5 illustrates a persistence context matrix in an embodiment of the invention.

FIG. 5 illustrates a persistence context matrix in an embodiment of the invention. In an embodiment of the invention, the environment manager provides persistence contexts and connections to the core persistence engine. This task is complex because many parameters influence the management of those objects. The persistence context matrix is intended to summarize the applicable degrees of freedom in an embodiment of the invention and how these degrees of freedom affect persistence contexts and connections.

FIG. 5, illustrates entries for persistence context (PC) control 505 and persistence context scope 510. For persistence context control 505, the operation may be container-managed 525 or application managed 530. Pursuant to the EJB 3.0 specification, entity managers retrieved via injection or JNDI (Java naming and directory interface) lookup are container-managed, and they are thus created and closed automatically by the container. Entity managers obtained from EntityManagerFactory.createEntityManager() are application-managed, which are closed explicitly by the application using the method EntityManager.close().

The container-managed PC control 525 results in a container-managed entity manager 555, for which there is persistence context propagation, while the application managed PC control 530 results in an application managed entity manager 560, for which there is no persistence context propagation. Container-managed entity managers support persistence context propagation, which means that different entity managers that have been obtained from the same entity manager factory and that are called within the same JTA transaction share the same persistence context. Application-managed entity managers do not share any persistence contexts, with each entity manager using its own persistence context.

For persistence context scope 510, an operation may be viewed as having transaction scope 515 or extended scope 520. This property controls the lifetime of the persistence context. Transaction-scoped persistence contexts are created when the entity manager is called for the first time within a particular transaction and the persistence contexts are closed when the corresponding transaction ends (with commit or rollback). Extended persistence contexts, on the other hand, exist beyond transaction boundaries. An extended persistence context is bound to a particular entity manager, the persistence context being created when the entity manager is created and it is closed when the entity manager is closed, either by the container or the application, depending on who controls the entity manager's lifecycle. The scope of the persistence context for container-managed entity managers is either provided by an annotation or XML tag. Application-managed entity managers always use a persistence context with extended scope.

FIG. 5 then illustrates the transaction type, JTA transactions or resource-local transactions, that be used in each circumstance. As shown, container-managed entity managers 555 support JTA transactions only, case (a) 535 and case (b) 545. However, for application-managed entity managers 560, the transaction type depends on the configuration of the entity manager factory, and thus as illustrated may be either resource-local or JTA, case (c) 550.

Additional degrees of freedom that are not depicted in the matrix may also exist. For example, the runtime environment is relevant. For EJBs, the issue is whether EJB 3.0 persistence is used inside a J2EE application server or in a J2SE (standalone) environment. In J2SE scenarios, JTA transactions are not supported, and only resource-local transactions can be used. Further, there is a transactional state in an operation, this state describing whether the entity manager is called within the scope of an active transaction or rather outside a transaction.

There are particular considerations that may come into play for each case shown in FIG. 5:

Case (a) 535—Outside a JTA transaction, a new persistence context is created to serve one EM method call only. Afterwards, it gets closed, i.e. its entities become detached. Inside the JTA transaction, the persistence context is shared between all participating entity managers, i.e., there is a 1:1 relationship between transaction and persistence context. Any call to one of the participating entity managers within the same JTA transaction operates on the same persistence context. The shared persistence context is created upon the first method call of an EM. Once the transaction ends by commit or rollback, the persistence context is synchronized with the database (commit only) and closed. To achieve this, the persistence context is registered upon creation as a listener to the JTA transaction manager's beforeCompletion event (for database synchronization) and afterCompletion event (for closing).

As a persistence context that has been created outside a JTA transaction ends before the next JTA transaction starts, there is no need to define the transition of this persistence context into the transaction.

Case (b) 545—This case is only eligible for stateful session beans. An extended persistence context is created upon the creation of its corresponding entity manager and destroyed when this entity manager is closed (i.e., when the stateful session bean's @Remove method is called). The entity manager uses the same persistence context instance throughout its entire lifecycle.

Changes to the extended persistence context outside a transaction are allowed. It is expected that these changes are propagated to the database at a later point in time within an active JTA transaction. In one embodiment of the invention, a persistence context is associated with a transaction upon request, for example using the joinTransaction command. In another possible, embodiment, the persistence context will be associated automatically (eagerly) with the next transaction opened on the same thread; no explicit call of the EntityManager API is be needed for this.

Inside a JTA transaction, the persistence context is shared between all participating entity managers in the same way as in case (a) 535. With extended persistence contexts, however, a collision of different persistence contexts within the same transaction is possible, which leads to an IllegalStateException. For example, a stateful session bean with an extended persistence context cannot call another stateful session bean with a different extended persistence context in the same transaction. Due to the eager association of the persistence context with the transaction, the collision occurs immediately at the beginning of a new transaction.

Case (c) 550—This is the same case as case (b) 545, except for the sharing of persistence contexts. In this case, there is no persistence context propagation, so each entity manager working within the same JTA transaction uses its own persistence context object throughout its entire lifetime.

There is a 1:1 relationship between entity manager factory and persistence context factory. In the JTA case, there is also a 1:1 relationship between entity manager factory and environment manager, while for the resource-local case, there is one environment manager instance per entity manager.

Figure 6:
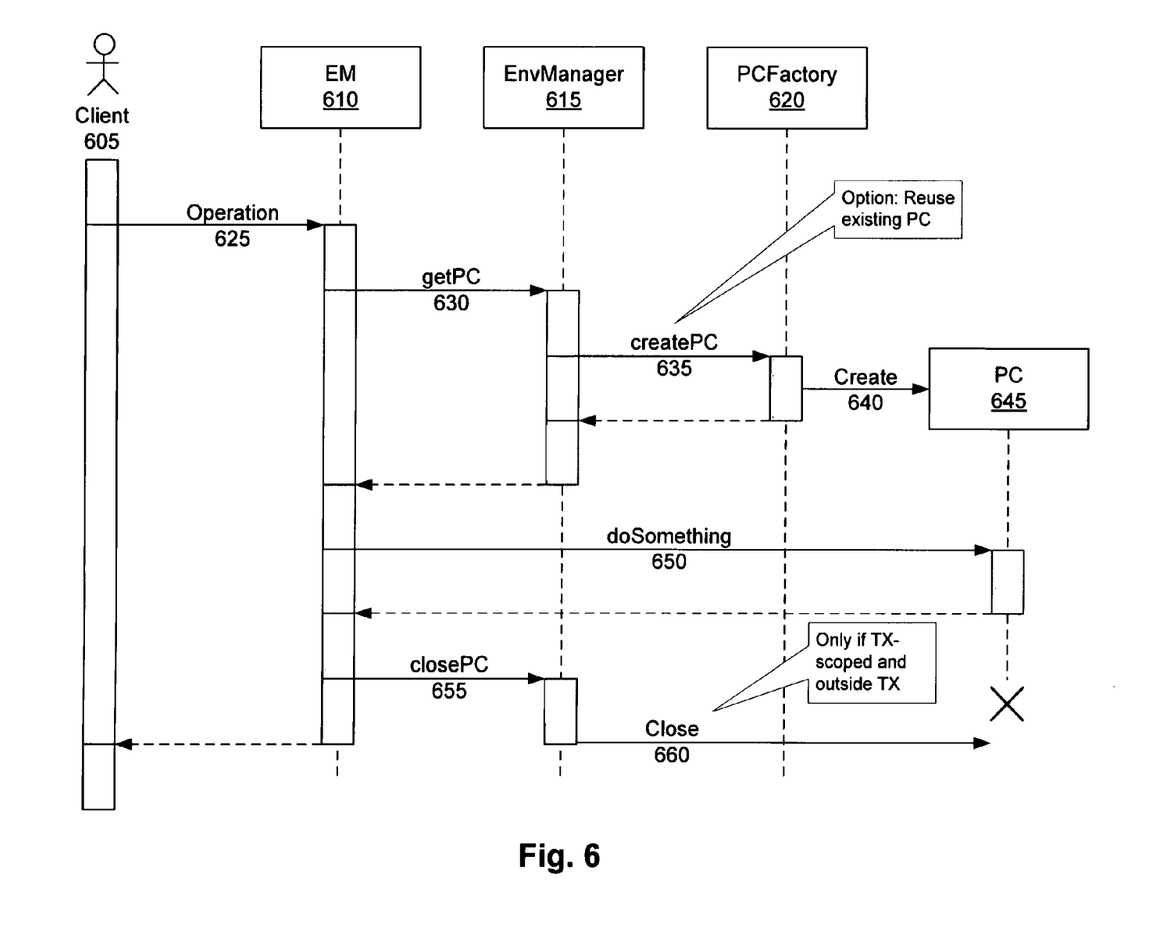
FIG. 6 illustrates the interaction between the entity manager, the environment manager and the persistence context in an embodiment of the invention.

FIG. 6 illustrates the interaction between the entity manager, the environment manager and the persistence context in an embodiment of the invention. In an embodiment, the entity manager (EM) 610 delegates the management of the persistence contexts to the environment manager 615. The entity manager 610 uses the persistence context for one method call only and calls the persistence context's close method immediately afterwards. For instance, a client 605 provides an operation 625 to an entity manager 610. The entity manage makes a call to get the persistence context 630 to the environment manager 615. The environment manager 615 makes a call to create the persistence context 635 to the persistence context factory 620, or in the alternative reuses an existing persistence context. The persistence context factory 620 creates 640 the persistence context 645, which is returned to the environment manager 615 and to the entity manager 650. The entity manager 610 utilizes the persistence manager 645 for some action 650, and then takes action to close the persistence context 655. The environment manager may then call a close method 660 if the operation is transaction scoped and outside the transaction.

Figure 7:
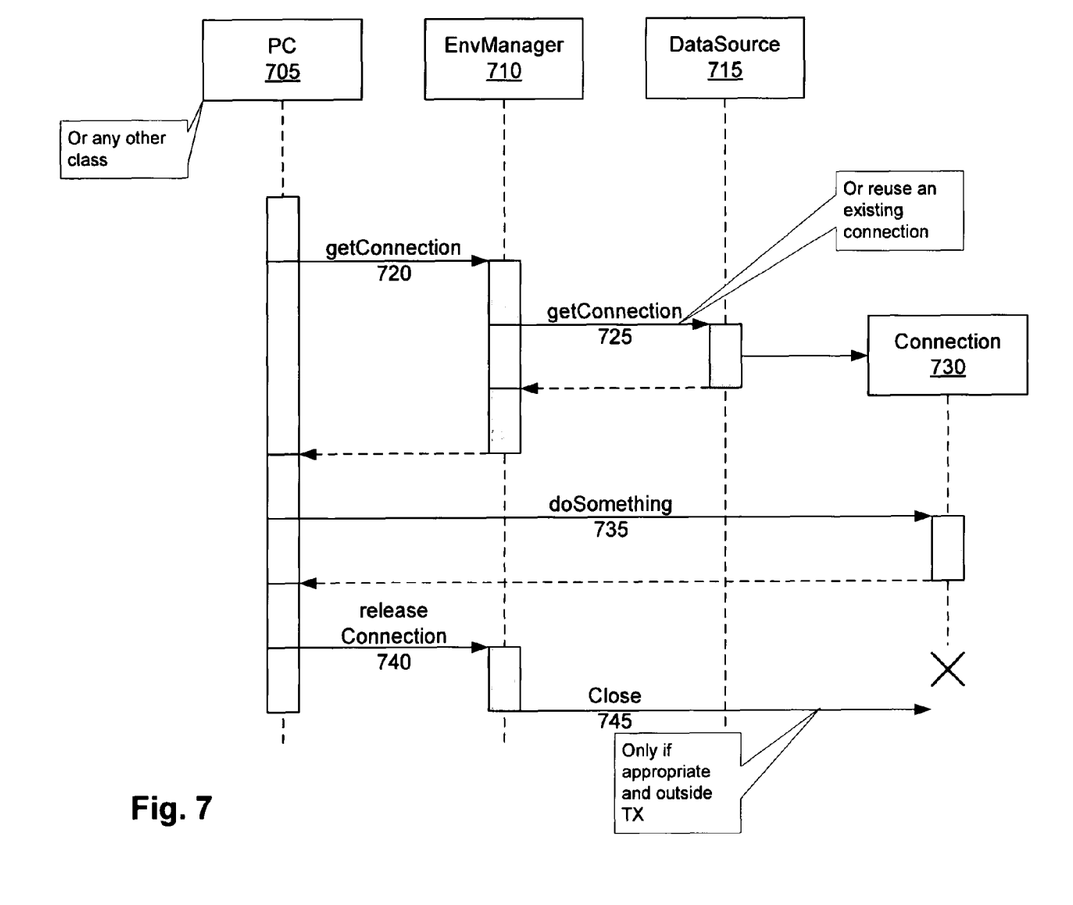
FIG. 7 illustrates an embodiment of a process for retrieving and using a connection for program components.

FIG. 7 illustrates an embodiment of a process for retrieving and using a connection. In this figure, a process is illustrated in which the persistence context, or any other class that needs a connection, interacts with the environment manager to retrieve and return a JDBC connection. The persistence context does not close the connection itself, but simply returns the connection to the environment manager, who is then responsible for closing the connection, if appropriate.

In this figure, the persistence context (PC) 705, or any other class, makes a request to the environment manager 710 to get a connection 720. The environment manager 710 makes a connection request 725 to the data source 715, or the environment manager 710 reuses and existing connection. The connection 730 is returned and the persistence context 705 makes a request for some action (doSomething) 735 via the connection 730. The persistence context 705 then makes a request to release the connection 740 to the environment manager. The environment manager 710 then request that the connection be closed 745 if appropriate and if outside the transaction.

Figure 8:
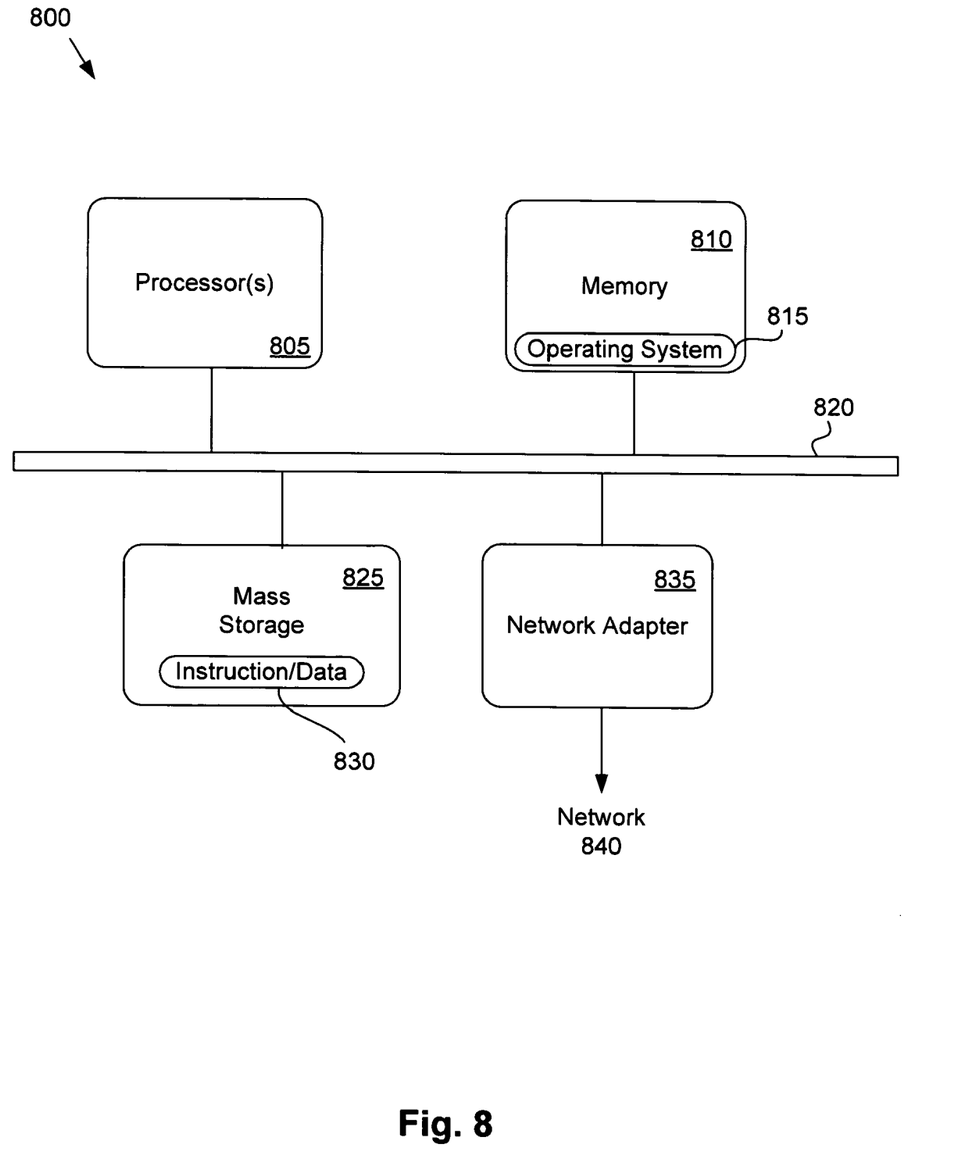
FIG. 8 is an illustration of a computer system in an embodiment of the invention.

FIG. 8 is an illustration of a computer system in an embodiment of the invention. As illustrated, a computing system 800 can execute program code stored by an article of manufacture. The computing system illustrated in FIG. 8 is only one of various possible computing system architectures, and is a simplified illustration that does include many well-known elements. A computer system 800 includes one or more processors 805 and memory 810 coupled to a bus system 820. The bus system 820 is an abstraction that represents any one or more separate physical buses, point-to-point connections, or both connected by appropriate bridges, adapters, or controllers. The bus system 820 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements thereto)

As illustrated in FIG. 8, the processors 805 are central processing units (CPUs) of the computer system 800 and control the overall operation of the computer system 800. The processors 805 execute software stored in memory 810. A processor 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 810 is or includes the main memory of the computer system 800. Memory 810 represents any form of random access memory (RAM), read-only memory (ROM), flash memory, or the like, or a combination of such devices. Memory 810 stores, among other things, the operating system 815 of the computer system 800.

Also connected to the processors 805 through the bus system 820 are one or more internal mass storage devices 825 and a network adapter 835. Internal mass storage devices 825 may be or may include any conventional medium for storing large volumes of instructions and data 830 in a non-volatile manner, such as one or more magnetic or optical based disks. The network adapter 835 provides the computer system 800 with the ability to communicate with remote devices, over a network 850 and may be, for example, an Ethernet adapter.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
receiving, from a persistence engine, first and second calls at an environment manager of a server, wherein
the first call requests a first persistence context for a first program component of a computer application existing in an enterprise environment and stored in a computer memory of a system,
the second call requests a second persistence context for a second program component included in a computer application existing in a standalone environment and stored in the computer memory of the system,
wherein the first and second persistence contexts hold the respective first and second program component instances and wherein the first and second persistence contexts operate to insure that each program component instance is unique within its own persistence context;
calling a method for the environment manager to obtain the first and second persistence contexts;
providing the first and second persistence contexts from the environment manager to the persistence engine; and
executing the first and second program components utilizing the respective first and second persistence contexts.

2. The method of claim 1, further comprising receiving at the environment manager a return of one of the persistence contexts from the persistence engine after a usage of the one persistence context.

3. The method of claim 2, further comprising closing the one persistence context if the one persistence context has a scope that is limited to a transaction and the transaction has ended.

4. The method of claim 1, wherein the environment manager is to further provide a persistence context both for a program component operating in a distributed transaction and a program component operating in a resource-local transaction.

5. The method of claim 1, wherein the first program component is managed by a container.

6. The method of claim 1, wherein the second program component is managed by the computer application.

7. A persistence system comprising:
a computer memory to store a computer application existing in an enterprise environment, the computer application including a first program component, and to store a computer application existing in a standalone environment, the computer application including a second program component;
a processor to execute the first and second program components;
a core persistence engine, the core persistence engine to manage the persistence of the first and second program components;
a persistence unit coupled with the core persistence engine, the persistence engine to define entities for management; and an environment manager coupled with the core persistence engine, the environment manager to provide first and second persistence contexts for the respective first and second program components, wherein the first and second persistence contexts hold the respective first and second program component instances and wherein the first and second persistence contexts operate to insure that each program component instance is unique within its own persistence context.

8. The persistence system of claim 7, wherein one of the program components is an enterprise JavaBean.

9. The persistence system of claim 7, wherein the core persistence engine sees the same result for both enterprise and standalone environments.

10. The persistence system of claim 7, wherein the first program component operates in a JAVA Transaction API (JTA) transaction or the second program component operates in a resource-local transaction.

11. The persistence system of claim 7, wherein the persistence engine includes an entity manager factory to generate one or more entity managers to manage persistence of program components.

12. The persistence system of claim 11, wherein an entity manager requests a persistence context object from the environment manager at the beginning of each method for the program component.

13. The persistence system for claim 12, wherein the entity manager returns the persistence context to the environment manager at the end of usage.

14. The persistence system of claim 11, wherein the environment manager is coupled with the entity manager factory.

15. The persistence system of claim 14, wherein the entity manager is managed by a container.

16. The persistence system of claim 14, wherein the entity manager utilizes distributed transactions.

17. The persistence system of claim 11, wherein the entity manager is not coupled with the entity manager factory.

18. The persistence system of claim 17, wherein the entity manager is managed by the computer application.

19. The persistence system of claim 17, wherein the environment manager utilizes either distributed transactions or resource local transactions.

20. The persistence system of claim 17, wherein the first persistence context may exist outside a transaction.

21. A computer-readable medium having stored thereon data representing sequences of instructions that, when executed by a processor, cause the processor to perform operations comprising:
    receiving, from a persistence engine, first and second calls at an environment manager of a server, wherein
    the first call requests a first persistence context for a first program component of a computer application existing in an enterprise environment and stored in a computer memory of a system,
    the second call requests a second persistence context for a second program component included in a computer application existing in a standalone environment and stored in the computer memory of the system,
    wherein the first and second persistence contexts hold the respective first and second program component instances and wherein the first and second persistence contexts operate to insure that each program component instance is unique within its own persistence context;
    calling a method for the environment manager to obtain the first and second persistence contexts;
    providing the first and second persistence contexts from the environment manager to the persistence engine; and
    executing the first and second program components utilizing the respective first and second persistence contexts.

22. The medium of claim 21, further comprising instructions to cause the processor to perform operation comprising:
    receiving at the environment manager a return of one of the persistence contexts from the persistence engine after a usage of the one persistence context; and
    closing the one persistence context if the one persistence context has a scope that is limited to a transaction and the transaction has ended.

23. The medium of claim 21, wherein the first program component is managed by a container.

24. The medium of claim 21, wherein the second program component is managed by the computer application.

* * * * *